United States Patent Office 3,138,174
Patented June 23, 1964

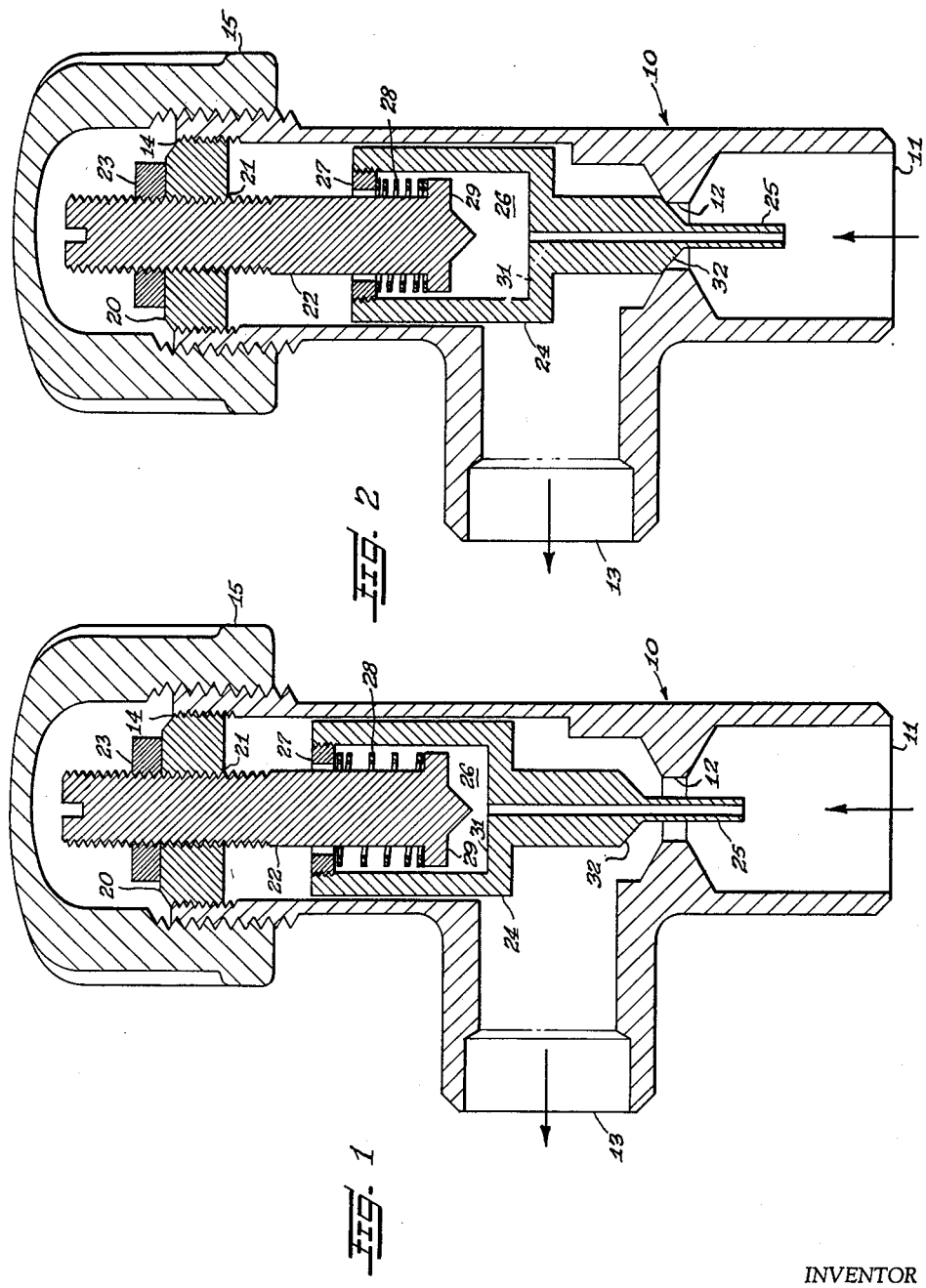

3,138,174
AUTOMATIC EXCESS FLUID FLOW VALVE
William V. Gilpin, 203 Vassar Drive SE.,
Albuquerque, N. Mex.
Filed Nov. 13, 1961, Ser. No. 151,808
4 Claims. (Cl. 137—498)

My invention relates to valves for automatically reducing the flow of a fluid which is in excess of normal flow.

One use for this type of valve is as a protective device against the loss of excessive amounts of gas from a gas main and against the resultant drop in line pressure, due to a downstream break in the line which creates an excess flow of gas through the line. Most frequently an excess flow is caused by trouble in a service line which is an offshoot from the main. A service line carries the gas to a user such as a household or an industrial concern. Thus it is most desirable to have the excess flow valve located at the junction of the service line with the main.

It is a general object of my invention to provide an automatic excess fluid flow valve which automatically drastically reduces the flow of fluid when the downstream pressure is reduced, such as by a break in a service line, and also to provide manually adjustable means for overriding the automatic feature, so the valve may be held open or completely closed regardless of the degree of flow. Thus, my valve may be manually opened to blow out dirt and chips, etc., with an excess flow or it may be manually closed to provide a shutoff for termination of service or for line repairs.

There is in common usage a service T which is installed in a service connection to a main line, the T containing a restrictive orifice to furnish a seat for an optional manually closeable valve in the T, providing a means for cutting off flow of gas to the service line in case of a service line rupture, or in case of termination of service to a customer. To accommodate the manual shutoff valve one arm of the T is internally threaded.

Thus it is another object of my invention to provide means insertable in a service T, the combination forming an automatic excess fluid flow valve. This makes possible protection against excess flow in all service lines by simply installing the means on an existing T, or, if the T contains a manual valve, by replacing it with the means.

Previous excess flow valves are for use with only liquids, not gases, and consist of a very loosely fitting piston or vane, spring-biased and located upstream from a seat. When excess flow occurs, the increased velocity pressure of the liquid against the piston forces it against the seat, shutting off the flow except for a small amount through a bypass. The purpose of the bypass is to allow the downstream volume to fill with liquid after the rupture is repaired, thus increasing the downstream pressure to a normal value and allowing the piston to return to its open position. These previous valves contain no provision for completely shutting off the flow of liquid including what flowed through the bypass, or for completely opening the valve regardless of the amount of flow. Also, at certain flows there is a tendency for the piston to chatter against the seat rather than remain completely open or closed. Previous valves are not insertable in service T's.

Another object of my invention is to provide an automatic excess fluid flow valve having a positive action which does not flutter or chatter at certain flow conditions.

A preferred embodiment of my invention accomplishes the above objects and others to become apparent, by means of a yieldably biased piston or a bellows, slideably mounted near the downstream side of a restrictive orifice located between an inlet and an outlet, all contained within a housing which may be a service T. The piston includes a means for transmitting the inlet pressure to a surface of the piston so that the force exerted thereby will oppose the combination of forces from the spring and from the reduced pressure of the outlet or downstream side of the orifice. My valve includes an adjustable feature so the piston can be set to allow a certain normal flow of fluid, but to automatically close the orifice on occurrence of an excess flow which creates a large differential pressure across the orifice. Optional means is provided to maintain a relatively small flow while the orifice is closed. The same adjustment when operated to extremes will override the mechanical feature either to hold the valve completely open regardless of flow or to completely shut off the flow of fluid through the valve, including the small flow maintained when the orifice is automatically closed.

A better understanding of my invention may be had by reading the more detailed description to follow in conjunction with the appended claims and the attached drawing, in which:

FIG. 1 shows a preferred embodiment of my invention installed in a service T, with the moving parts in their relative positions corresponding to normal flow; and FIG. 2 shows the embodiment of FIG. 2 as it appears following a condition of excess flow.

The preferred embodiment will be described in connection with a gas line, although it will be obvious that the invention is also useful with all fluids, liquid or gaseous.

Referring now to the drawing, service T 10 is shown with an inlet 11 including a restrictive orifice 12, and an outlet 13. The inlet and restrictive orifice are located in one arm of the T, while the outlet is in the leg. When used to provide a service connection to a gas main, inlet 11 is connected to the main and outlet 13 is connected to the service line. The other arm of the T is internally threaded at 14 and is externally threaded to receive a protective cap 15. The service T shown is fairly standard in the industry and is used either with or without a manually operated valve which is threadably engaged at 14 and which is capable of closing orifice 12 when seated against the downstream side thereof.

The preferred embodiment of my invention includes plug 20 which is threadably engaged with the T arm at 14 and which has a threaded central aperture 21 for receiving adjusting screw 22. Locknut 23 is provided to prevent adjusting screw 22 from turning once it has been correctly adjusted. Piston 24 is loosely slideably mounted within the arms of the T and includes tube 25 which extends from inlet 11 to one end of chamber 26 and transmits the fluid pressure present at the inlet to the chamber.

Insert 27 in the piston acts as the other end of the chamber and loosely encircles adjusting screw 22. Spring 28 encircles the adjusting screw and is mounted between insert 27 and screw end 29. The end of the screw is pointed at its center so that the screw can be manually adjusted to close off tube 25. End 29 loosely fits within chamber 26, so that the inlet pressure is transmitted without much loss past end 29 and screw 22 to the top of piston 24.

When gas flows from the inlet to the outlet of the T, a differential pressure is developed across orifice 12 due to the flow, so that the pressure at outlet 13 is reduced compared to that at inlet 11. It will be noticed that tube 25 extends upstream beyond the orifice and thus accurately senses the inlet pressure without being affected by the velocity of the gas through the orifice. By means of the tube and the loose-fitting adjusting screw the inlet pressure also is present above the piston, forcing it toward orifice 12. This compresses spring 28 between insert 27 and end 29 of adjusting screw 22. Thus, the force due to the inlet pressure overcomes the force of the spring.

The pressure downstream from the orifice, which may be called the outlet pressure, acts against various lower surfaces of the piston to add to the force of the spring in opposing the force due to inlet pressure acting against various upper surfaces of the piston. Adjusting screw 22 is set to position piston 24 to allow a normal flow of fluid through the valve. The piston, then, is balanced as in FIG. 1 between the various forces involved during normal gas flow.

If an excess flow of gas occurs from the inlet to the outlet, perhaps due to a major break in the service line, the outlet pressure will be reduced drastically, due both to the increase in differential pressure across orifice 12 and to the outlet being effectively at outside or atmospheric pressure. The inlet pressure, however, remains essentially the same and is still transmitted to the top of the piston. Since piston 24 now is subjected to a force unbalanced in a direction toward the orifice, it is moved toward the orifice decreasing the orifice size, increasing the differential pressure, and further increasing the force unbalance until beveled portion 32 closes the orifice.

The operation of my valve may be explained mathematically as follows:

$P_o$ = outlet fluid pressure
$A_1$ = piston area subject to $P_o$
$P_i$ = inlet fluid pressure
$A_2$ = piston area subject to $P_i$
$F_y$ = force of spring or other yieldable means During normal flow, with the piston positioned away from the orifice:

$$P_i A_2 = P_o A_1 + F_y$$

During excess flow:

$$P_i A_2 > P_o A_1 + F_y$$

and the orifice is closed by the piston.

The automatic closing action of the valve is seen to be due to an increasing force, once the piston starts to move. This is an important feature of my invention and is the reason why my valve does not chatter, as do prior excess liquid flow valves of a different construction. My valve is relatively unaffected by velocity pressures, while prior valves operate entirely by those pressures.

However, there still remains a comparatively small flow of gas through a bypass consisting of tube 25, the space around end 29, between adjusting screw 22 and insert 27, and between piston 24 and the inner wall of the T. This small flow allows the outlet pressure to build up after the service line is repaired. When the buildup occurs piston 24 will no longer be subjected to a large differential pressure and the spring will return the piston from its position in FIG. 2 to the normal flow position of FIG. 1. Tube 25 and the clearances between screw 22 and the piston must be sufficiently large to transmit the inlet pressure to the upper surfaces of the piston without substantial reduction due to flow losses, while the clearance between the piston and the T must be relatively small in order to maintain a differential pressure across the piston to hold it against the orifice.

The bypass is not necessary if the downstream pressure is raised by means of a pump or a tank of compressed gas after repair of the service line. This will have the same effect as the bypass, lowering the differential pressure until the spring moves the piston and opens the orifice.

The automatic operation of my valve has been explained. There will be times, however, when it is desirable to allow an excess flow from the inlet to the outlet, such as during first installation or when it is required to clean accumulated scale or chips from the valve or the service line. In that instance, cap 15 may be removed from the valve and adjusting screw 22 turned in a direction to move piston 24 away from orifice 12 to the extent that the force exerted on the piston by excess flow will not be able to move the piston far enough to close the orifice. This procedure also will restore the line to service after repair of a break, when a bypass is not used.

At other times, such as during installation or repair of a service line connected to outlet 13, it is desirable that absolutely no flow of gas or fluid be allowed. At that time adjusting screw 22 can be adjusted toward orifice 12 until pointed end 29 of the screw bears against end 31 of chamber 26, closing tube 25 and forcing beveled portion 32 of the piston against the orifice, thus closing it also. Thus, I have provided an adjustable means for overriding the automatic action of my invention when so desired.

Although not shown, a bellows can be used in place of the piston and the spring, with or without a bypass. The bellows will expand and contract proportional to the differential pressure across it, operating a beveled member similar to portion 32 of the piston to close and open the orifice. Tube 25 is used to transmit the inlet pressure to the inside of the bellows, the outside being exposed to the outlet pressure. The bellows is considered to be a yieldably-biased means, since the inherent action is similar to that of a piston and spring, or of a piston and other yieldable biasing means.

I have described a preferred embodiment of my automatic excess fluid flow valve which is useful with either liquids or gases and, is particularly adaptable to existing service T's and gas lines. However, I do not intend to restrict my patent protection to the embodiment described or to its use in a service T. Variations from the embodiment may be made by those skilled in the art without departing from the sphere and scope of my invention defined by the claims below.

I claim as my invention:

1. An automatic excess fluid flow valve comprising:
   a T having an outlet in its leg and a restrictive orifice in an inlet arm, the other arm being internally threaded;
   a piston loosely slideably mounted within the arms, including a portion adapted and arranged to seat against the outlet side of the orifice, and further including a pressure-transmitting tube extending from beyond the inlet side of the orifice to an end of a chamber within the piston;
   a plug with a central aperture, threadably engaged with the inside of the other arm;
   an adjusting screw threadably engaged with the central aperture, extending into the piston chamber and including end means for blocking the tube at its juncture with the chamber;
   a spring mounted between the end means and the end of a chamber opposite the tube end;
   and means for locking the adjusting screw;
   the piston being designed so that pressure-induced force under conditions of excess flow is sufficient to overcome the bias of the spring and force the piston closed against the orifice.

2. The valve of claim 1 wherein a bypass is provided between the adjusting screw and the piston, and between the piston and the T whereby a relatively small flow is maintained after closure of the orifice by an excess flow; the bypass portion between the piston and the T being more restrictive to flow than the flow path through the pressure-transmitting tube and the bypass portion between the screw and the piston.

3. Means insertable in a T having an outlet in its leg and a restrictive orifice in an inlet arm, the other arm being internally threaded, said means forming an automatic excess fluid flow valve with the T, comprising:
   a piston loosely slideably mounted within the arms, including a portion adapted and arranged to seat against the outlet side of the orifice, and further including a pressure-transmitting tube extending from beyond the inlet side of the orifice to an end of a chamber within the piston;

a plug with a central aperture, threadably engaged with the inside of the other arm;

an adjusting screw threadably engaged with the central aperture, extending into the piston chamber and including end means for blocking the tube at its juncture with the chamber;

a spring mounted between the end means and the end of the chamber opposite the tube end;

and means for locking the adjusting screw;

the piston being designed so that pressure-induced force under conditions of excess flow is sufficient to overcome the bias of the spring and force the piston closed against the orifice.

4. The means of claim 3 wherein a bypass is provided between the adjusting screw and the piston, and between the piston and the T whereby a relatively small flow is maintained after closure of the orifice by an excess flow; the bypass portion between the piston and the T being more restrictive to flow than the flow path through the pressure-transmitting tube and the bypass portion between the screw and the piston.

References Cited in the file of this patent

UNITED STATES PATENTS

| | | |
|---|---|---|
| 1,477,244 | Collins | Dec. 11, 1923 |
| 1,508,398 | Kelly | Sept. 26, 1924 |
| 2,668,555 | Bartolat | Feb. 9, 1954 |
| 2,716,997 | Crookston | Sept. 6, 1955 |
| 2,864,400 | Wiegel | Dec. 16, 1958 |
| 3,103,338 | Marmo | Sept. 10, 1963 |